US011703565B2

(12) United States Patent
Schlehuber

(10) Patent No.: US 11,703,565 B2
(45) Date of Patent: Jul. 18, 2023

(54) METHODS AND APPARATUS FOR IDENTIFYING AND PREVENTING TRACKING OF FALSE PRIMARY TARGET REPORTS

(71) Applicant: Raytheon Company, Waltham, MA (US)

(72) Inventor: Steven R. Schlehuber, Marlborough, MA (US)

(73) Assignee: Raytheon Company, Waltham, MA (US)

( * ) Notice: Subject to any disclaimer, the term of this patent is extended or adjusted under 35 U.S.C. 154(b) by 524 days.

(21) Appl. No.: 16/834,768

(22) Filed: Mar. 30, 2020

(65) Prior Publication Data

US 2021/0302537 A1 Sep. 30, 2021

(51) Int. Cl.
*G01S 7/41* (2006.01)
*G01S 13/72* (2006.01)
*G01S 13/91* (2006.01)

(52) U.S. Cl.
CPC ............ *G01S 7/414* (2013.01); *G01S 13/723* (2013.01); *G01S 13/91* (2013.01)

(58) Field of Classification Search
CPC ......... G01S 7/414; G01S 13/723; G01S 13/91
See application file for complete search history.

(56) References Cited

U.S. PATENT DOCUMENTS

| | | | |
|---|---|---|---|
| 4,449,127 A | 5/1984 | Sanchez | |
| 5,394,152 A * | 2/1995 | Pieronek | G01S 13/91 342/40 |
| 5,712,785 A * | 1/1998 | Mok | G01S 13/913 342/36 |
| 5,877,721 A | 3/1999 | Tsang | |
| 6,473,027 B1 | 10/2002 | Alon | |
| 7,626,535 B2 * | 12/2009 | Ding | G01S 13/726 342/96 |
| 7,675,456 B2 | 3/2010 | Karam | |
| 7,675,458 B2 * | 3/2010 | Hubbard | G01S 13/5246 342/159 |
| 8,917,201 B2 | 12/2014 | Malaga | |
| 9,116,235 B2 | 8/2015 | Gelli | |
| 9,417,310 B2 | 8/2016 | Meloche | |
| 10,209,344 B2 | 2/2019 | Dougherty | |
| 10,247,815 B1 | 4/2019 | Koubiadis | |

(Continued)

FOREIGN PATENT DOCUMENTS

| | | | | |
|---|---|---|---|---|
| EP | 3273262 A1 * | 1/2018 | | G01S 13/44 |
| FR | 2501868 A1 | 3/1985 | | |

*Primary Examiner* — Timothy A Brainard
*Assistant Examiner* — Ismaaeel A. Siddiquee
(74) *Attorney, Agent, or Firm* — Renner, Otto, Boisselle & Sklar, LLP

(57) ABSTRACT

A tracking method and system includes receiving a primary radar report after establishment of a real track of the aircraft, determining a false track slant range associated with the aircraft based on an effective altitude of the aircraft above a ground or water surface and an aircraft slant range defined between the radar arranged on the ground surface and the aircraft, determining a capture area based on the false track slant range and an azimuth of the aircraft, and determining whether the primary radar report is a false report by comparing a position of the aircraft determined from the primary radar report to the capture area.

20 Claims, 11 Drawing Sheets

(56) References Cited

U.S. PATENT DOCUMENTS

| | | | |
|---|---|---|---|
| 10,459,075 B2 | 10/2019 | Clark | |
| 2002/0180631 A1* | 12/2002 | Alon | G01S 13/91 342/107 |
| 2009/0167591 A1* | 7/2009 | Abbett | G01S 13/878 342/451 |
| 2010/0085237 A1* | 4/2010 | Cornic | G01S 13/685 342/33 |
| 2013/0265186 A1* | 10/2013 | Gelli | G01S 7/02 342/32 |
| 2017/0330465 A1* | 11/2017 | Kim | G08G 5/0013 |
| 2018/0240348 A1* | 8/2018 | Ren | G08G 5/0043 |

\* cited by examiner

METHODS AND APPARATUS FOR IDENTIFYING AND PREVENTING TRACKING OF FALSE PRIMARY TARGET REPORTS

GOVERNMENT LICENSE RIGHTS

This invention was made with government support under contract number DTFA01-96-D-03008 FFP 1000, awarded by the Federal Aviation Administration. The government has certain rights in the invention.

FIELD OF THE INVENTION

The invention relates to methods for identifying and preventing tracking of false primary targets that appear proximate a real aircraft.

DESCRIPTION OF THE RELATED ART

In aircraft tracking systems, an aircraft may be illuminated by a primary radar such that reflections are generated. The radar energy that is reflected off of the ground or bodies of water from a large bodied aircraft may result in a second high confidence report for a target in a primary radar report generated by the primary radar. When the primary radar report is disseminated to an air traffic control (ATC) automation system, an additional false track that is offset from a track of the real aircraft is displayed. The additional track may appear to controllers as a wingman that is in formation with the real aircraft, i.e. a "phantom wingman," as in a military formation that includes an aircraft detected by primary and/or secondary radar and an accompanying aircraft detected only by primary radar. The false track may follow a similar direction and path of the real aircraft.

The ATC system may process the false primary radar report as if the false report is a report for a real aircraft. Track initiation and establishment may subsequently be performed by the ATC system on the false reports leading to the creation of false tracks. Thus, conventional tracking systems are deficient in that the controller workload may be burdened by processing false reports and false tracks.

SUMMARY OF THE INVENTION

A tracking method and system for an aircraft according to the present application may be implemented into an existing ATC automation system. The method and system use a unique path of a reflection that likely corresponds to a false report. This surface reflection return path geometry occurs from the ground directly below the aircraft, up to the aircraft, and from the aircraft to the radar. Due to this reflection, the radar generates two reports for the aircraft nearly simultaneously, with one report corresponding to the actual or real aircraft and the second report corresponding to a detection based on the unique path of reflection. The first report may be a reinforced report that contains various data for the aircraft such as slant range, azimuth, altitude, and codes such as a Mode 3A beacon code and a Mode 2 code. The second report may be a primary radar only report that contains less data than a reinforced report, such as only slant range and azimuth data. If the slant range data of the second report is longer than the slant range of the first report that corresponds to the real aircraft, the system and method determines that the second report may correspond to a false report and a false track because the reflected energy travelled farther.

An expected location, or capture area, for a false track may be determined based on data corresponding to a real track that has been established for the aircraft. The data includes the slant range from the radar, an effective altitude above the ground surface, and an azimuth from the radar The effective altitude and slant range of the real track relative to the radar added together form a false track slant range. The false track slant range and azimuth of the real track define the capture area where the false track may be located. The method and system are configured to determine the capture area and determine whether a position indicated in the second report is in the capture area. If the position is in the capture area, the second report, i.e. the primary radar report, may be a potential false report.

If the primary radar report is determined to be a potential false report, the primary radar report is further processed and may be processed using a set of discriminators that will include or exclude the primary radar report. The discriminators may be used to limit processing to real commercial aircraft and to prevent processing of aircraft that is military and has an actual real wingman. The discriminators are dependent on the application. Various characteristics of the real track for the aircraft and a primary radar report may be detected and compared to stored discriminator data corresponding to at least one of military codes, a flight plan for the aircraft, a predetermined number of aircraft, a weight class, a Military Operations Area assignment, a flight operations category, an altitude threshold, a slant range threshold, and a number of supporting radars for the real track of the aircraft.

If the primary radar report meets the set of discriminators, it is flagged as a potential false report. The ATC system may then perform an association and correlation process. During association and correlating, if the primary radar report is determined to correlate to an existing established "real" track for the aircraft, the report may be used to update the track even though the report is indicated as being potentially false. Typically, a track undergo initiation, and then subsequently, after a predetermined amount of time, establishment. If the primary radar report is determined to correlate to an existing track that is not yet established, the track may not be allowed to continue initiation and establishment. If the primary radar report is determined not to correlate to an existing track, the primary radar report will not be allowed to initiate a new track.

Radars or other surveillance sources used with the system and method may be separate systems from the ATC automation system. In exemplary embodiments, the radar may still disseminate false reports even if the ATC system identifies them as false and decides not to initiate its own track on those reports. In exemplary embodiments, the radar itself may not be a tracking radar. The radar may be configured to send detections as reports or tracks. In some, but not necessarily all embodiments, the ATC system may not communicate back to the radars and may not be able to tell the radar to not disseminate the reports or tracks. The ATC system may be configured to decide whether to present reports to the controllers as tracks. Many different configurations of the system may be suitable.

According to an aspect of the invention, a tracking method and system includes using a unique surface reflection return path geometry of an aircraft to determine a capture area.

According to an aspect of the invention, a tracking method and system includes determining whether a primary radar report is a false report by comparing a position from the primary radar report to a capture area determined by the method and system.

According to an aspect of the invention, a tracking method and system includes determining whether a primary radar report is a potential false report.

According to an aspect of the invention, a tracking method and system includes determining whether a potential false report correlates to an existing real track for an aircraft.

According to an aspect of the invention, a tracking method and system includes preventing track initiation and establishment for a false report.

According to an aspect of the invention, a tracking method and system includes using discriminators to determine whether a primary radar report is a potential false report or a report for a real wingman aircraft in formation or any aircraft.

According to an aspect of the invention, a computer implemented method for tracking an aircraft using a radar includes receiving a primary radar report after establishment of a real track of the aircraft, determining a false track slant range associated with the aircraft based on an effective altitude of the aircraft above a ground or water surface and an aircraft slant range defined between the radar arranged on the ground and the aircraft, determining a capture area based on the false track slant range and an azimuth of the aircraft, and determining whether the primary radar report is a false report by comparing a position from the primary radar report to the capture area.

According to an embodiment of any paragraph(s) of this summary, the azimuth of the aircraft is determined based on the established real track associated with the aircraft.

According to an embodiment of any paragraph(s) of this summary, determining the false track slant range includes adding the aircraft slant range and the altitude together to equal the false track slant range.

According to an embodiment of any paragraph(s) of this summary, the method includes determining that the primary radar report is a false report if the position is in the capture area, and excluding the false report from a new track initiation or establishment of a new track that is proximate the aircraft.

According to an embodiment of any paragraph(s) of this summary, the method includes storing data corresponding to a set of discriminators, determining whether the primary radar report is the false report further based on the stored set of discriminators, determining whether the primary radar report correlates to at least one of a plurality of existing tracks if the primary radar report is determined to be the false report, and excluding the false report from a new track initiation or establishment of a new track that is proximate the aircraft if the primary radar report does not correlate to at least one of the plurality of existing tracks.

According to an embodiment of any paragraph(s) of this summary, the method includes updating at least one of the plurality of existing tracks using the primary radar report if the primary radar report is determined to correlate to the corresponding one of the plurality of existing tracks, or initiating a new track for another aircraft using the primary radar report if the primary radar report is determined to not correlate to at least one of the plurality of existing tracks.

According to an embodiment of any paragraph(s) of this summary, the method includes storing data corresponding to a predetermined delta azimuth threshold, determining an absolute value of a delta azimuth between a real track azimuth of the aircraft and an azimuth indicated in the primary radar report, comparing the absolute value to the stored data corresponding to the predetermined delta azimuth threshold, and identifying the primary radar report as the false report if the absolute value is less than or equal to the stored data corresponding to the predetermined delta azimuth threshold.

According to an embodiment of any paragraph(s) of this summary, storing data corresponding to a predetermined false track slant range threshold, determining an absolute value of a delta slant range between the aircraft slant range and a primary radar report slant range of the primary radar report, comparing the absolute value to the stored data corresponding to the predetermined false track slant range threshold, and identifying the primary radar report as the false report if the absolute value is less than or equal to the stored data corresponding to the predetermined false track slant range threshold, and the primary radar report slant range is greater than the aircraft slant range.

According to an embodiment of any paragraph(s) of this summary, determining the false track slant range includes determining a surface level distance between the ground surface and the radar.

According to an embodiment of any paragraph(s) of this summary, the method includes storing data corresponding to an altitude constraint for the real track, detecting an altitude of the real track, and identifying the primary radar report as a false report if the detected altitude of the real track is less than or equal to the altitude constraint.

According to an embodiment of any paragraph(s) of this summary, the method includes storing data corresponding to a slant range constraint for the false track slant range, and identifying the primary radar report as a false report if a slant range indicated in the primary radar report is less than or equal to the slant range constraint.

According to an embodiment of any paragraph(s) of this summary, the method includes storing data corresponding to a Mode 3A code for the real track of the aircraft, and determining that the primary radar report is not a false report if the real track has an invalid or non-discrete Mode 3A code.

According to an embodiment of any paragraph(s) of this summary, the method includes determining that the primary radar report is not a false report if the real track squawks a Mode 2 code.

According to an embodiment of any paragraph(s) of this summary, the method includes storing flight plan data corresponding to the real track of the aircraft, and determining if the primary radar report is a false report based on whether the real track is associated or unassociated with the flight plan.

According to an embodiment of any paragraph(s) of this summary, the method includes determining that the primary radar report is not a false report if the flight plan includes data corresponding to a number of aircraft being more than one.

According to an embodiment of any paragraph(s) of this summary, the method includes determining that the primary radar report is not a false report if the flight plan indicates that the detected real track is assigned to a Military Operations Area.

According to an embodiment of any paragraph(s) of this summary, the method includes determining whether the primary radar report is a false report based on a weight class of the real track according to the flight plan.

According to an embodiment of any paragraph(s) of this summary, the method includes determining the false track slant range includes using a reflection return path that occurs from the aircraft to the ground surface to the radar.

According to an embodiment of any paragraph(s) of this summary, a computer-readable medium having processor-executable instructions implementable to execute the computer implemented method.

According to another aspect of the invention, a tracking system for an aircraft includes a radar configured to detect a primary radar report, and a processor communicatively coupled to the radar for receiving the primary radar report, wherein the processor is configured to establish a real track for the aircraft, determine a false track slant range associated with the aircraft based on an effective altitude of the aircraft above a ground surface and an aircraft slant range defined between the radar arranged on the ground surface and the aircraft, determine a capture area based on the false track slant range and an azimuth of the aircraft, and determine whether the primary radar report is a false report by comparing a position of the aircraft determined from the primary radar report to the capture area.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF DRAWINGS

The annexed drawings, which are not necessarily to scale, show various aspects of the invention.

DETAILED DESCRIPTION

Figure 1:
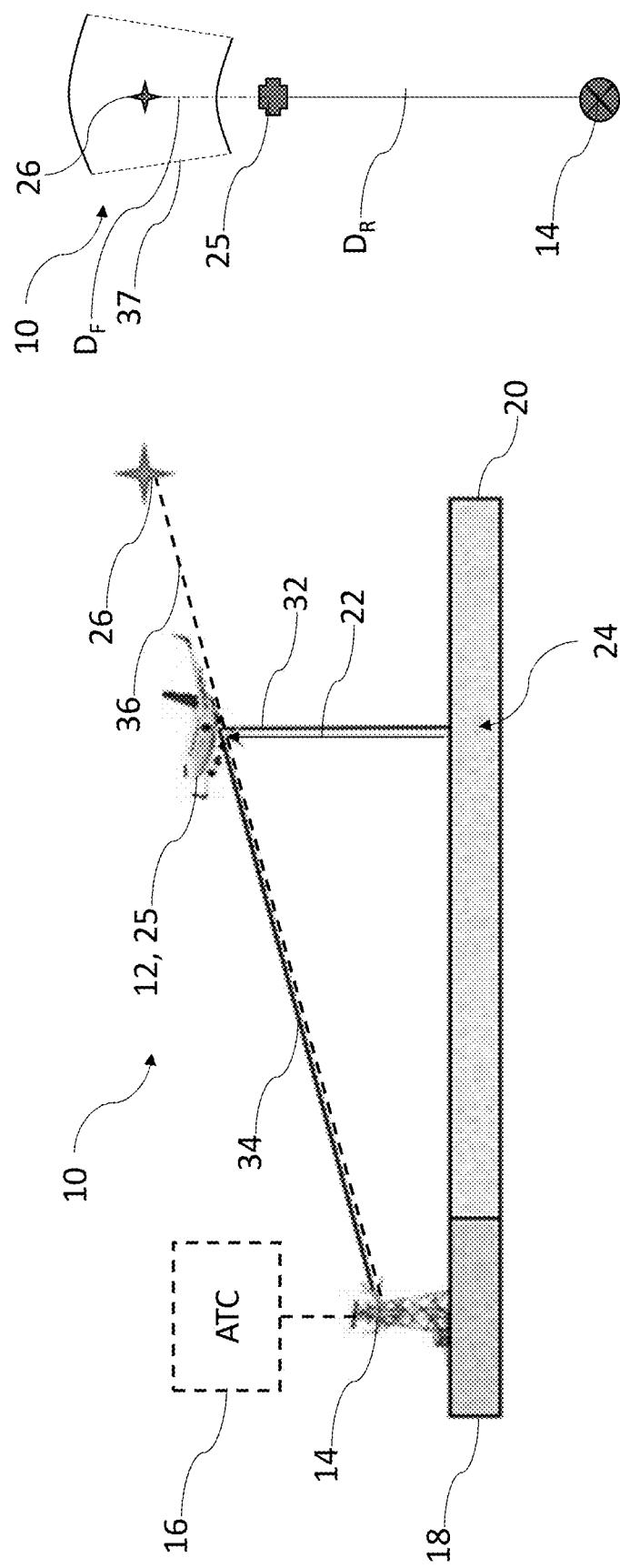
FIG. 1A shows a tracking system for an aircraft.
FIG. 1B shows a capture area for a potential false track of the aircraft in the tracking system of FIG. 1A.

The principles described herein have particular application in systems for detecting aircraft, such as large body aircraft. An exemplary system may use a radar that detects a target or object, such as an aircraft or clutter. The radar is configured to generate reports that corresponds to the detected object and the reports are disseminated to an ATC system. In some embodiments, the system and method described herein may be implemented in an ATC system, such as an existing or future ATC system. In some other embodiments, the methods described herein may be implemented by another system separate from the ATC system but that could communicate and/or interface with the ATC system.

Referring first to FIGS. 1A and 1B, a tracking system 10 for an exemplary aircraft 12 is shown. The aircraft 12 may be a small aircraft, a large bodied aircraft, or an aircraft having any size. The aircraft 12 may also be referred to as a "real aircraft" meaning that the aircraft 12 is a target or an object of interest to the tracking system 10. The tracking system 10 includes a radar 14 configured to generate data, or reports that are disseminated to an air traffic control (ATC) automation system 16 that is part of the tracking system 10. The ATC system 16 may include the radar 14 in some but not necessarily all embodiments.

In an exemplary embodiment, the radar 14 may be configured to have both a primary surveillance radar (PSR) coupled with a secondary surveillance radar (SSR), such that the radar 14 is a collocated radar. The radar 14 is configured to output primary reports, secondary reports, and combined reports, which are also referred to as reinforced reports, if both radars detect an object at the same location. For example, the radar 14 may include a combiner algorithm which combines two reports and transmits a single reinforced report to the ATC system 16. The primary radar report may only have slant range and azimuth data, as detected by the PSR without the SSR. In contrast, a secondary and reinforced report may also provide slant range and azimuth with the addition of a beacon code, such as a Mode 3A code, a Mode 2 code, or other codes, and altitude data, as detected by both the PSR and the SSR.

The radar 14 is configured to detect reflections caused by the aircraft 12. The standard or normal reflection path for the aircraft 12 is formed by energy from the radar 14 illuminating the aircraft 12 and reflecting directly back, meaning that the energy is reflected from the radar 14 to the aircraft 12 and directly back to the radar 14. Advantageously, the tracking system 10 described herein is also configured to process data resulting from a unique reflection path that may correspond to false tracks or a "phantom wingman" for the real aircraft. False tracks are not a desired tracking object for the ATC system 16 as they do not provide accurate information about the aircraft and require wasted processing by the ATC system 16.

In the unique reflection, or second reflection, energy from the radar 14 illuminates the aircraft 12 and is directed to a ground surface 18 on which the radar 14 is arranged, or a body of water 20 over which the aircraft 12 is travelling, such that a reflection return path 22 directly between the aircraft 12 and the ground surface 18 is generated. The reflection return path 22 is formed between a location 24 along the ground surface 18 or the body of water 20 that is directly below the aircraft 12 and upwardly to the body of the aircraft 12, and back to the radar 14. The distance of the primary radar energy that reflects off of the aircraft 12 and reaches the surface of the ground surface 18 may be approximately equal to the aircraft altitude when the ground surface 18 is at sea level. If the energy is directed to the ground 18, the ground extends directly under the aircraft and there may be no water.

Due to the reflections off of the aircraft 12 and off of the ground 18, the radar 14 may provide the ATC system 16 with two reports for the aircraft 12 that are provided simultaneously or nearly simultaneously, with the first report corresponding to the real aircraft 12 and the normal reflection path being from the radar 14 to the aircraft 12 and back to the radar 14. The first report corresponding to the real aircraft 12 may be a reinforced report having both detection by the PSR and the SSR. The second report may be a primary radar only report, such that the report does not include detection by the SSR and thus contains less data as compared with the reinforced report. The second report corresponds to the unique reflection geometry being the energy traveling from the radar 14 to the aircraft 12 to the ground surface 18 or water below the aircraft 12, back up to the aircraft 12 and back to the radar 14. In contrast to the reinforced report, the second report only has data pertaining to the slant range and azimuth, without data pertaining to beacon codes. After determining that the second report is a primary radar only report, the tracking system 10 is configured to then determine whether the second report, which is referred to herein as the primary radar report, corresponds to a false track as will be described further below.

As shown in FIG. 1B, prior to determining whether the second report corresponds to a phantom wingman, a real track 25 for the aircraft 12 must be established. The real track 25 may be used to monitor the travel of the aircraft 12 by a controller of the ATC system 16. Tracks are typically first initiated by the ATC system 16, and subsequently established after a predetermined amount of time, using a basic tracking mechanism that may be implemented in the ATC system 16. The first report may be used in establishing a real track 25 that corresponds to the aircraft 12. The basic tracking mechanism includes a report, such as the first report, undergoing an association and correlation process that is performed by the ATC system 16. The ATC system 16 is configured to compare the report to other received reports to determine whether the first report correlates or relates to any existing tracks that were previously established. The slant range, azimuth, altitude, Mode C code, Mode 3A code, type of report, or any other attribute of the report may be used in making the determination.

The report may compete with many other received reports. If the ATC system 16 determines that the report correlates to an existing track, the existing track may continue on into initiation and establishment processing. Alternatively, the report may be used to update the track to continue to maintain data for the track. If the ATC system 16 determines that the report does not correlate to an existing track, the report may be eligible to initiate a new track so long as filtering mechanisms or other eligibility processing mechanisms are not in place. If an existing track is not updated for a predetermined amount of time, the track may be terminated by the ATC system 16.

If the ATC system 16 determines that the second report is not a primary radar report, i.e. the second report is a secondary report, a reinforced report, or a report from some other non-radar surveillance source, the second report may also undergo the aforementioned association and correlation processing to determine whether the report is related to any existing track, rather than continue on to be processed as a potential false track.

Figure 2:
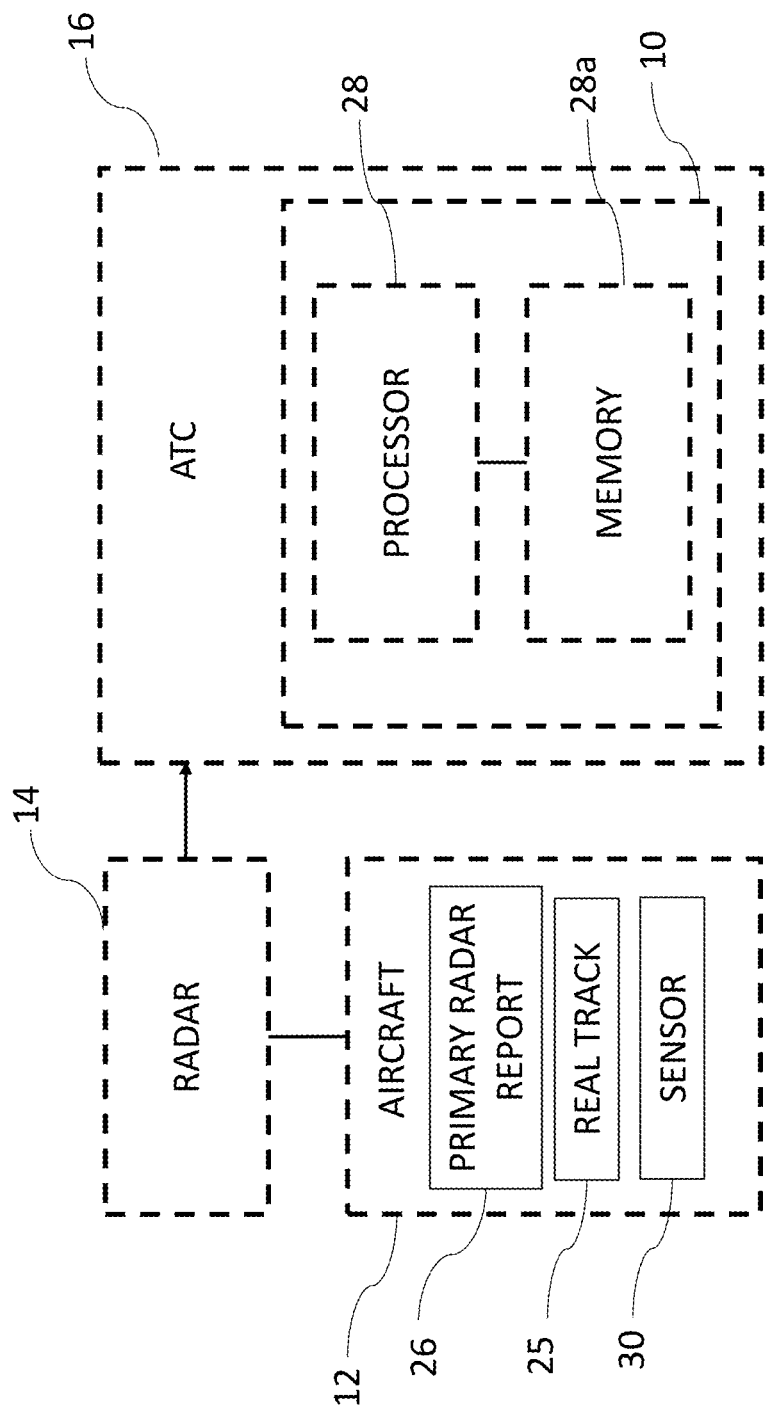
FIG. 2 shows an exemplary control system for the tracking system of FIG. 1A.

Referring in addition to FIG. 2, once a real track 25 is established and the second report is determined to be a primary radar report 26 by the ATC system 16, the ATC system 16 is configured to determine whether the primary radar report 26 corresponds to a false track. It should be recognized that in exemplary embodiments, the radar 14 may send reports to the ATC system 16 regardless of whether the primary radar report is a real aircraft, clutter, or a false report. It should also be recognized that any suitable radar or other sensors may be used. For example, the radar 14 may be an ASR-9 Mode S type radar. Other suitable radar systems may include ASR-11, TDX 2000, CD2, ARSR-3, and ARSR-4. In exemplary applications, other sensors that the ATC system 16 may receive reports from are Automatic Dependent Surveillance Broadcast (ADS-B) systems, Multilateration systems (MLAT), Wide Area Multilateration systems (WAM). These sensors may not produce a potential false primary radar report and instead provide reports that support and sustain the real track for the aircraft in addition to providing beacon codes and altitude data.

The tracking system 10 may include any software, firmware, and/or hardware implementation, including microprocessors 28 and circuitry such as a field-programmable gate array (FPGA). The aircraft 12 is configured to send data to the radar 14, such as with various sensors of the aircraft 12. In the exemplary embodiment described herein, the ATC system 16 may not communicate back to the radar 14. In other exemplary embodiments, the ATC system 16 and the processor 28 may communicate back to the radar 14.

The tracking system 10 includes a plurality of sensors. For example, a sensor 30 may be used to measure an altitude 32 of the aircraft 12 above the ground surface 18, which is the vertical height of the aircraft 12, as shown in FIG. 1A. The radar or sensors that detect aircraft may receive an altitude from interrogation of the aircraft transponder. Some sensors may be able to triangulate with other sensors and calculate or measure the altitude. The altitude of the aircraft 12 always reflects the height above mean sea level. Any suitable distance sensor may be used. The altitude 32 may also be pressure corrected depending on the environment. The sensor 30 may be incorporated in the control system of the aircraft 12.

Using the radar, sensors, and other suitable components, the ATC system 16 is configured to first associate the primary radar report 26 with a nearby real track for the aircraft 12. After the ATC system 16 associates the primary radar report 26 with nearby real tracks, the ATC system 16 is configured to determine a capture area for each real track. The capture area is based on a slant range of the real track, the effective altitude above the ground surface, and the azimuth from the radar. An aircraft slant range 34 of the real track 25 is defined between the radar 14 and the aircraft 12. The aircraft slant range 34 is measured or determined by the ATC system 16 using the height of the radar 14 relative to the ground surface 18, the altitude 32 of the aircraft 12, and the distance between the radar 14 and the real aircraft ground range on the earth directly below the aircraft 12.

An azimuth of the real track 25 is also determined by the ATC system 16. As shown in FIG. 1B, line DR has a direction that represents the azimuth of the real track 25 and a distance that represents the slant range 34 of the real track 25. The azimuth of the real track 25, or of the aircraft 12 with respect to the radar 14 may also be adjusted by time. For example, the time of detection of the primary radar report may be different than when the real track 25 was last updated, such that the real track 25 may have moved slightly depending on speed and heading of the aircraft 12. The azimuth may be time corrected by moving the track position by the difference in time between the primary radar report and the time the track 25 was last updated. Similarly, the aircraft slant range 34 may also be time corrected.

The processor 28 of the ATC system 16 is configured to determine or approximate a false track slant range 36, as shown in FIG. 1A, that is equal to the aircraft slant range 34 and the pressure corrected altitude 32 being added together. Determining or approximating the false track slant range 36 may also include compensating for a surface level of the ground 18. The ground estimation may include using at least one of or an average of at least two of an elevation of an airport, a radar 14 elevation, or an altitude of a Minimum Safe Altitude Warning (MSAW). The actual surface level of the ground at the location of the aircraft 12 that is available to the ATC system 16 may also be used. As shown in FIG. 1B, the false track slant range 36 may be used to further determine a specific capture area 37 surrounding the false track slant range 36. The capture area 37 is used for comparison with positions indicated in the primary radar report 26.

The capture area 37 of the false track slant range 36 may be defined by more than one of a predetermined azimuth range, altitude range, and slant range relative to the real aircraft 12. The capture area 37 may be defined as an area that surrounds at least an azimuth and slant range of the primary radar report 26 to ensure that the azimuth of the primary radar report 26 azimuth is within a threshold of the azimuth of the real track 25 for the real aircraft 12, and at the same time, within a threshold of the false track slant range. The width of the capture area 37 may be defined by the real track azimuth and the false track azimuth threshold. The distance of the capture area 37 may be defined by the false track slant range and the false track slant range threshold. As shown in FIG. 1B, line DF has a direction from the radar 14 that represents the azimuth of the primary radar report 26 and a distance from the radar 14 that represents the slant range 36 of the primary radar report 26. The altitude of the real track 25 may be used to determine if the capture area 37 falls within a predetermined altitude range. A capture area may be determined for each real track that is nearby and associated to the primary radar report 26.

The ATC 16 is configured to determine whether the primary radar report 26 is a false report, or "phantom wingman," by comparing data of the detected primary radar report 26 to predetermined data stored in a memory 28a of the tracking system 10. For example, the capture area 37 may be saved as data in the memory 28a such that the detected position indicated in the primary radar report 26 is compared to the stored capture area 37. The slant range and azimuth of the primary radar report 26 may compared to the capture area 37. If the processor 28 determines that the position indicated in the primary radar report 26 is in the capture area 37, the processor 28 will flag the primary radar report 26 as a potential false report.

The processor 28 may then be configured to further process the primary radar report 26 to determine if the primary radar report 26 is actually a false report. If, after undergoing further process, the primary radar report 26 is determined to be a false report, the processor 28 may be configured to prevent track initiation for the primary radar report 26. If the primary radar report 26 is not in the capture area 37, the primary radar report 26 is not a potential false report and is further processed by the ATC system 16. For example, the non-potential false report may undergo the association and correlation process for comparison with existing tracks as previously described.

If the primary radar report 26 is in the capture area 37, the memory 28a may contain stored data corresponding to a set of predetermined discriminators to prevent suppressing track initiation in the event that the primary radar report 26 is a real wingman formation for the aircraft 12. The discriminators are derived from the real track 25 that the ATC system 16 is maintaining. For example, if a real wingman is detected within the capture area 37, the discriminators may be used to enable the real wingman to move in and out of the capture area 37 without being excluded from track initiation and establishment, or updating and processing by the ATC system 16. The processor 28 may be configured to, subsequent to determining that the primary radar report 26 is a potential false report, compare data from the primary radar report 26 to the stored set of discriminators to ensure that a correct determination about the primary radar report 26 is made. Many different discriminators are possible and the discriminators are dependent on the application. Using discriminators may also reduce the volume of primary radar reports that require further processing by the ATC system 16 to determine whether a primary radar report is a false report.

Exemplary discriminators may include at least one of military squawk codes, a flight plan corresponding to the aircraft 12, a number of aircraft associated with the flight plan, a weight class defined by the flight plan, a predetermined altitude threshold, a predetermined slant range threshold, a number of supporting radars for the primary radar report 26, a flight assignment to a Military Operations Area (MOA), or the assigned flight operations category. Flight operations categories could include general aviation, air carrier, military, and air taxi. Using data corresponding to the flight plan of the aircraft 12 may be advantageous in limiting the processing of the primary radar report 26 to aircraft that are of more interest to controllers by only processing real tracks of aircraft that are associated with a flight plan as being a source for a reflection that could lead to a potential false report.

Figure 3:
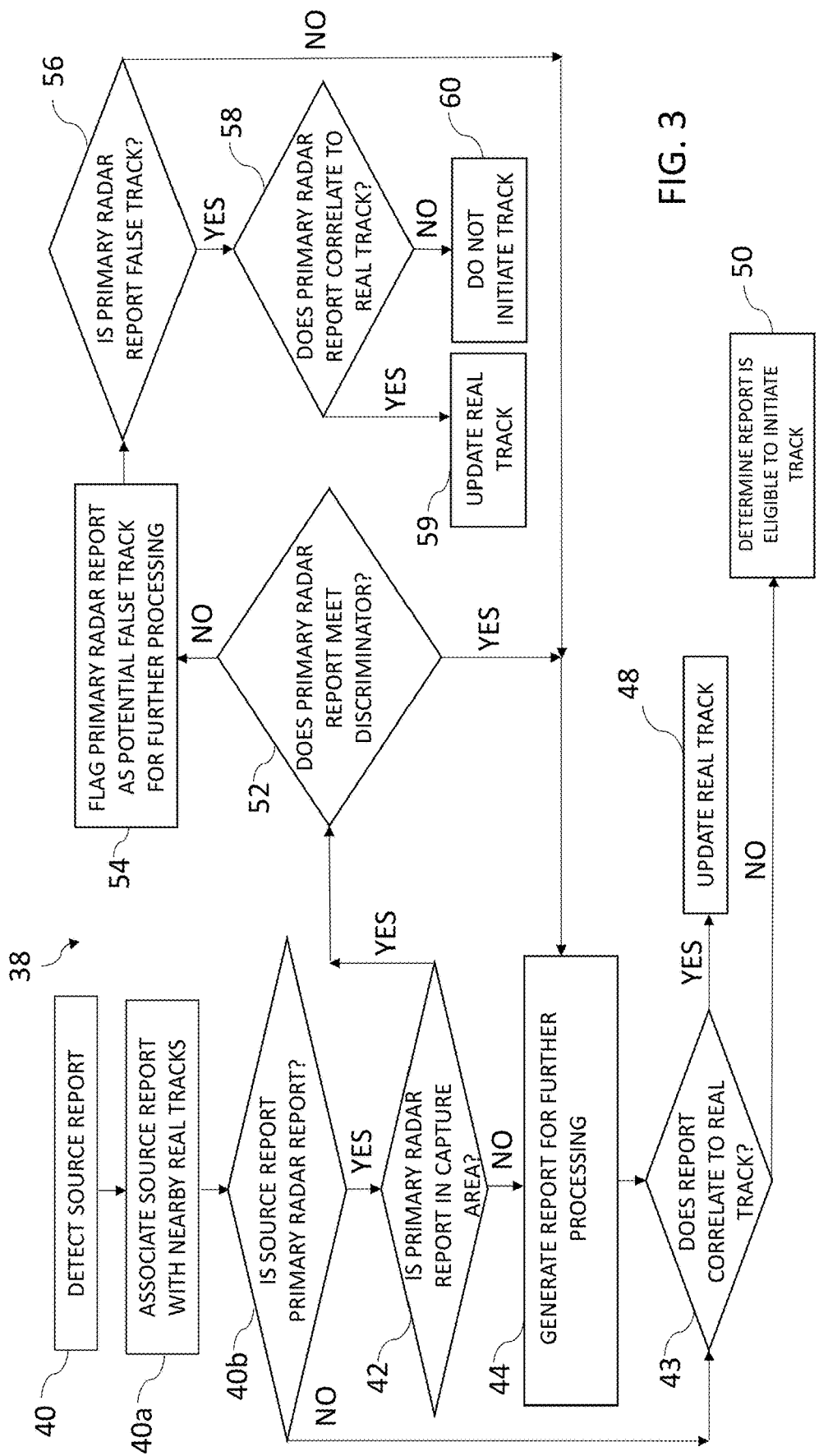
FIG. 3 shows a method of determining whether the primary radar report is a false report using the tracking system of FIG. 1A.

FIG. 3 shows a method 38 of tracking the aircraft 12 using the tracking system 10. Step 40 of the method 38 includes detecting a source report that is proximate the aircraft 12 and may be performed using the radar 14. Step 40 includes detecting an incoming source report by determining that the incoming source report is associated with or correlates to nearby real tracks 25 of the aircraft 12. The source reports may include reinforced reports and primary only reports as previously described. Step 40a includes associating the source report with nearby real tracks 25 which is performed by the ATC system 16. The associating of the source report with the real track 25 may be based on attributes of the real track 25 itself, such as altitude, slant range, azimuth, flight plan, and accompanying information.

After the source report is associated with nearby real tracks 25, step 40b includes determining whether the source report is a primary radar report 26 (shown in FIGS. 1 and 2). If the source report is a primary radar report 26, the primary radar report 26 is determined as potentially being a false report and step 42 is performed. If the primary radar report 26 is not a primary radar report, step 43 occurs in which it is determined whether the source report correlates to an existing real track 25. A plurality of real tracks may exist. For example, if the report is a beacon report or a reinforced report, rather than a primary radar report, the report does not correspond to a potential false track and step 43 occurs.

Step 42 includes determining whether a position of the detected primary radar report 26 is in the capture area 37, after the capture area 37 has been determined. The processor 28 is configured to perform step 42 by comparing a detected position of the primary radar report 26 to the capture area 37. As described further below, prior to determining whether the position of the primary radar report 26 is in the capture area 37, the method 38 includes first determining whether the slant range 36 of the primary radar report 26 is longer than the slant range 34 of the real track 25 for the aircraft 12. The slant range 36 must be longer than the slant range 34 given that the reflected energy corresponding to a potential false track would travel a farther distance as compared with the reflection corresponding to the real track 25.

If the processor 28 determines that the primary radar report 26 is not in the capture area 37, the primary radar report 26 is identified as not being a potential false report, i.e. the primary radar report 26 is not flagged. The unflagged primary radar report 26 is then further processed in step 44 of the method 38. Step 44 may include generating a report for further processing. The primary radar report 26 may then be further processed in step 43 in which it is determined whether the primary radar report 26 correlates to an existing real track 25. If the ATC system 16 determines that the primary radar report 26 correlates to an existing real track 25, such that the primary radar report 26 may be a real wingman or other aircraft, the primary radar report 26 may be eligible to potentially update the real track 25 within the tracking mechanism of the ATC system 16, such that step 48 occurs. If the primary radar report 26 correlates to an existing track, but the track is not yet established, the existing track may be allowed to continue initiation processing and establishment. If the primary radar report 26 is not correlated to an existing real track 25, step 50 may occur and the primary radar report 26 may be determined as being eligible to initiate a new track for another aircraft. Step 50 may then include discarding the primary radar report 26, or displaying the primary radar report 26 on the ATC system as a track, or displaying the primary radar report 26 on the ATC system as a plot, using symbology that does not identify the primary radar report 26 as a track.

If the processor 28 determines that the primary radar report 26 is within the capture area 37, the processor 28 may use further discriminators to determine whether the primary radar report 26 is further processed as a potential false report. Step 52 of the method 38 includes determining whether the primary radar report 26 meets a discriminator, meaning that the primary radar report 26 satisfies a predetermined condition to determine the next step. The discriminator is dependent on the application and the flight plan associated with the real track 25 for the aircraft 12. If the primary radar report 26 meets the discriminator, step 44, and the additional steps 43, 48, 50, may occur in which the primary radar report 26 is not flagged as a potential false report and further processing occurs. For example, the discriminator may be used to prevent a military wingman formation that is detected in the capture area from being flagged as a potential false report.

If the primary radar report 26 does not meet the discriminator, the processor 28 may flag the primary radar report 26 as a potential false report for further processing in step 54. In an exemplary application, step 54 may occur directly subsequent to step 42 if it is determined that the primary radar report 26 is in the capture area 37 such that further discriminators are not necessary. Further processing of the flagged primary radar report 26 includes step 56 in which it is determined whether the primary radar report 26 is a false report. Step 56 may be performed by the processor 28 or the ATC system 16 may receive communication that the primary radar report 26 has been flagged as a potential false report.

If the primary radar report 26 is determined to not be a false report, step 44 of the method 38 may occur and the primary radar report 26 may be further processed. If the primary radar report 26 is determined to be a false report, step 58 occurs in which it is determined if the primary radar report 26 correlates to an existing real track 25. A plurality of real tracks may exist. If the primary radar report 26 is correlated to an existing real track 25, step 59 occurs and the real track 25 may be updated even though the primary radar report 26 was flagged as being potentially false. If the primary radar report 26 is not correlated to an existing real track 25, step 60 occurs in which the primary radar report 26 is excluded from track initiation such that the ATC system 16 does not track the primary radar report 26. Step 60 may include displaying the primary radar report 26 on the ATC system as a plot, using symbology that does not identify the primary radar report 26 as a track. Using steps 58-60 is advantageous in that a real wingman or aircraft that is already tracked may move in and out of real track capture areas thus avoiding being suppressed.

Figure 4:
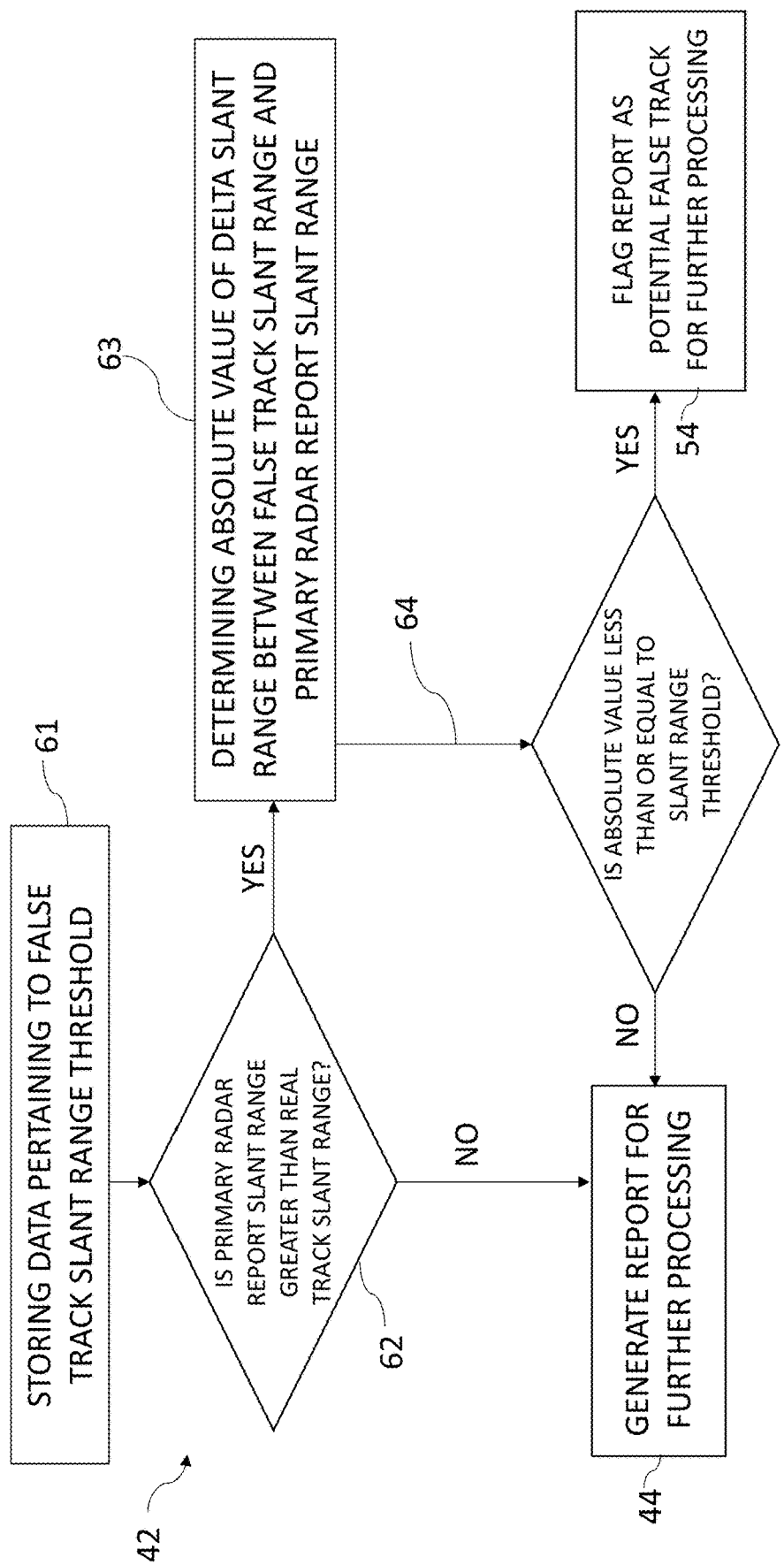
FIG. 4 shows a method of determining if the primary radar report is in a capture area for the method of FIG. 3.

Referring now to FIG. 4, step 42 of determining whether the detected primary radar report 26 is in the capture area includes using data pertaining to azimuth and slant range. A further step 61 includes storing data corresponding to a predetermined false track slant range threshold. As aforementioned, step 62 includes determining whether the slant range of the primary radar report 26 is greater than the slant range 34 of the real track 25. If the slant range of the primary radar report 26 is not greater than the real track 25, step 44 occurs in which the primary radar report 26 is further processed. If the slant range of the primary radar report 26 is greater than the slant range 34 of the real track 25, step 63 occurs and includes determining an absolute value of a delta slant range between the false track slant range 36, as determined by the ATC system 16, and a slant range of the primary radar report 26. Step 64 includes comparing the determined absolute value to the absolute value of the stored data corresponding to the predetermined false track slant range threshold. If the absolute value is less than or equal to the stored data corresponding to the predetermined false track slant range threshold, the processor 28 may determine that the primary radar report 26 is a potential false report and step 54 of the method 38 may occur, if the azimuth threshold is also met. If the absolute value is greater than the stored data corresponding to the predetermined false track slant range threshold, step 44 of the method 38 may occur in which the primary radar report 26 is further processed. Any default absolute value range may be suitable for a threshold. For example, a value between 0.7 and 2.0 nautical miles may be suitable.

Figure 5:
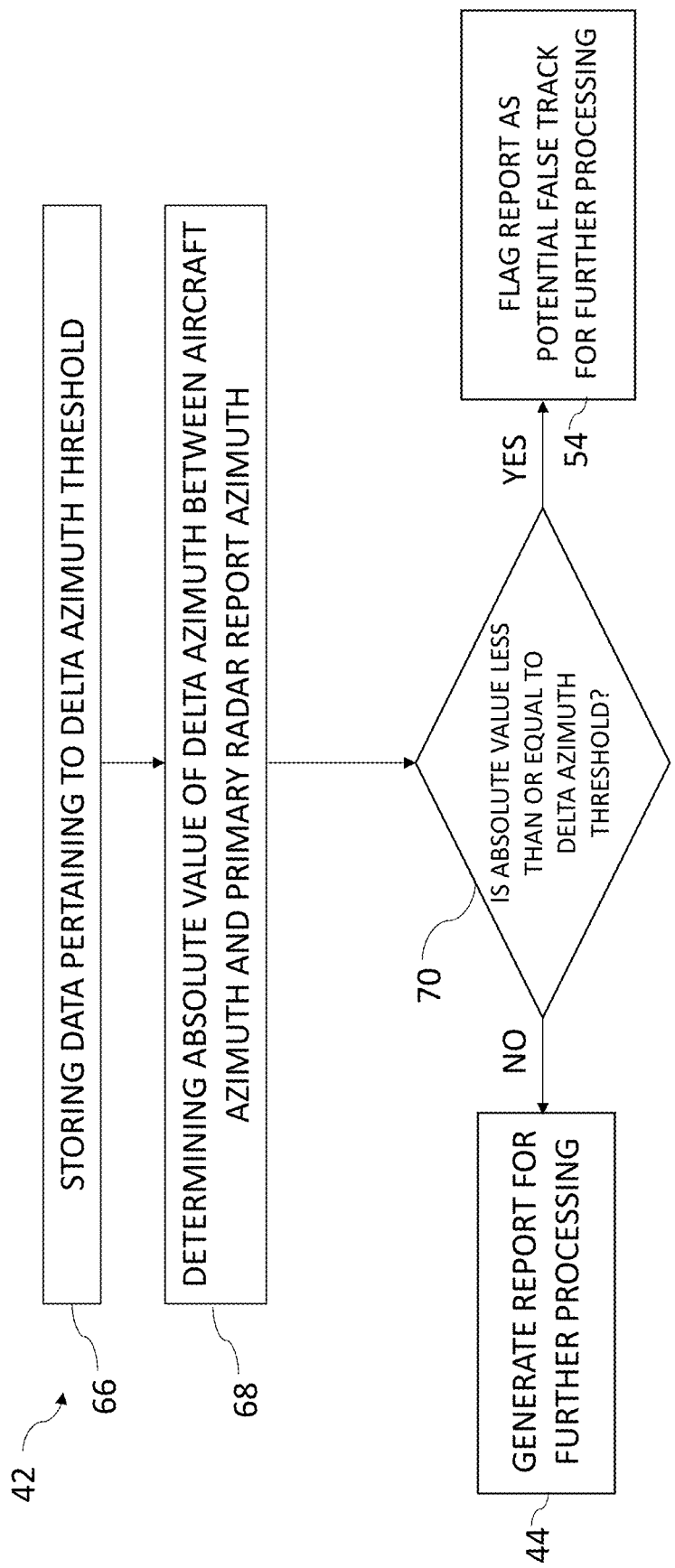
FIG. 5 shows another method of determining if the primary radar report is in the capture area of the aircraft for the method of FIG. 3.

Referring now to FIG. 5, step 42 may include determining whether the primary radar report 26 is in an azimuth range for a false track. A further step 66 may include storing data corresponding to a predetermined delta azimuth threshold in the memory 28*a*. Step 68 may include determining an absolute value of a delta azimuth between the real track azimuth of the aircraft 12 and a primary radar report azimuth of the primary radar report 26. Step 70 of the method 38 may include comparing the absolute value to the stored data corresponding to the predetermined delta azimuth threshold and flagging the primary radar report 26 as a potential false report in step 54 if the absolute value is less than or equal to the stored data corresponding to the predetermined delta azimuth threshold. If the absolute value is greater than the predetermined delta azimuth threshold, step 44 of the method 38 occurs in which the primary radar report 26 may be further processed. Any default absolute value range may be suitable as a threshold. For example, a value between 0.5 and 2.0 degrees may be suitable.

In other exemplary embodiments, step 42 of determining whether the primary radar report 26 is in the capture area may further include using an altitude and/or slant range constraint such that the slant range of the primary radar report 26 must be less than or equal to the constraint value to be processed as a potential false report in step 54 of the method 38. Any suitable constraint values may be set. For example, the slant range constraint may be a value that is between 0 and 255 nautical miles, such as approximately 30 nautical miles. If the detected data exceeds the constraint value, step 44 of the method 38 may occur and the primary radar report 26 may be further processed. Steps 61-64 may be performed prior to determining whether the primary radar report 26 is in the capture area 37.

Using the geometric criteria is advantageous in that detected data for the primary radar report 26 may be required to meet the geometric criteria of the reference data for the real aircraft 12. The primary radar report 26 may only be considered to be a potential false report if the primary radar report 26 meets all of the geometric criteria. In an exemplary embodiment, the geometric criteria may include the primary report azimuth being within a false track azimuth error threshold of a real aircraft reference report, the slant range of the primary report being greater than the slant range of the real aircraft reference report, and the slant range of the primary report being within the slant range error threshold of the determined false track slant range based on the reference report. The slant range of the primary radar report 26 must always be greater than the slant range of the real aircraft reference report in order for the primary radar report to qualify as a potential false report.

Referring now to FIGS. 6-9, step 52 of determining whether the primary radar report 26 meets a discriminator may include using different discriminators. Any number of discriminators may be used. A military application may have different discriminators as compared with the discriminators for a commercial or non-military application. The discriminator determinations may be performed sequentially, such that subsequent discriminator determinations are dependent on satisfying preceding discriminator determinations, or may be performed simultaneously, or nearly simultaneously.

Figure 6:
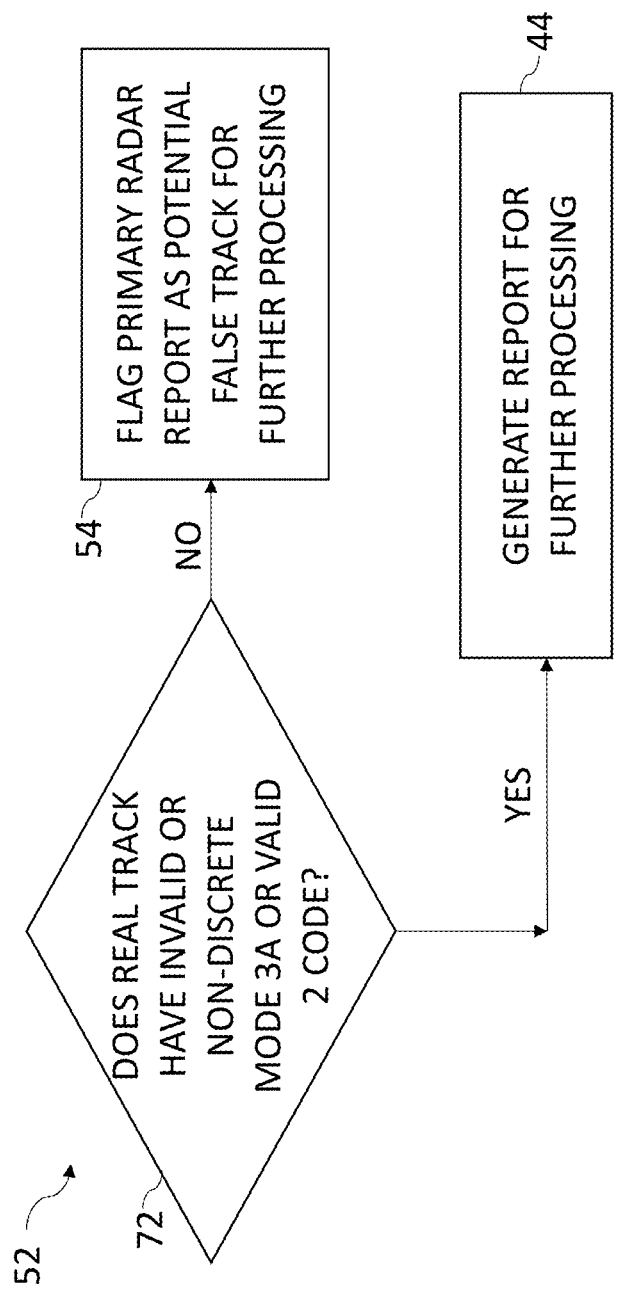
FIG. 6 shows an exemplary discriminator method for suppressing a determination that the primary radar report is a false report.

FIG. 6 shows the step 52 including using beacon code discriminators. For example, the discriminators may include using a Mode 2 Code and/or Mode 3A Code such that step 72 may include determining whether the real track for the aircraft has an invalid or non-discrete Mode 3A Code or squawks a Mode 2 Code. Other codes may be suitable. A transponder of an aircraft or wingman may include a transponder having a set of controls and a transponder code, which is referred to as the beacon code or the squawk code. A leader of a military formation may squawk both a Mode 3A Code and a Mode 2 Code whereas a wingman may only squawk a Mode 2 Code or no code at all. A commercial aircraft may only squawk a Mode 3A Code. The processor 28 may be configured to determine that if the real track of the aircraft is generating a Mode 2 Code, the primary radar report is not a false report, since it could be a wingman, such that step 44 occurs in which further processing of the primary radar report 26 occurs. If the real track does not generate the appropriate military Mode 2 code but squawks Mode 3A code, step 54 may occur in which the primary radar report 26 is flagged as a potential false report. The Mode 3A code discriminator could be configured such that the Mode 3A code must be a discrete code, or if non-discrete, must be a Special Condition code. Using the codes is advantageous in limiting the processing to typical commercial aircraft that squawk discrete Mode 3A codes or during an emergency situation and also advantageous in excluding military aircraft that may be flying in formation.

Still another discriminator for a military application may include determining a flight assignment to an MOA such that the primary radar report 26 may not be flagged as a potential false report if the real track for the aircraft 12 is in an MOA or the flight plan for the real track indicates it is assigned to an MOA. Another discriminator may include using the flight operations category of the flight plan such that the primary radar report 26 may not be flagged as a potential false report if the flight plan for the real track identifies the operations category as military operations.

In a military application or in a commercial application, step 52 may also include determining whether the real track is associated with a flight plan of the aircraft 12. Limiting the processing to aircraft that have filed flight plans is advantageous in that it may include all controlled commercial aircraft. The flight plan may be stored and act as a discriminator for comparing the detected data of the real track to the stored flight plan data. If the real track is not associated with a flight plan, the primary radar report 26 may not be flagged as a potential false report and step 44 of the method 38 may occur in which the primary radar report 26 may be further processed. If the real track is determined to be a non-primary track that is associated with the flight plan, the primary radar report 26 may be flagged as a potential false report and step 54 of the method 38 may occur. A non-primary track type may include a primary radar report that is supported by beacon reports from a secondary surveillance radar, ADS-B, or Wide Area Multilateration (WAM).

Figure 7:
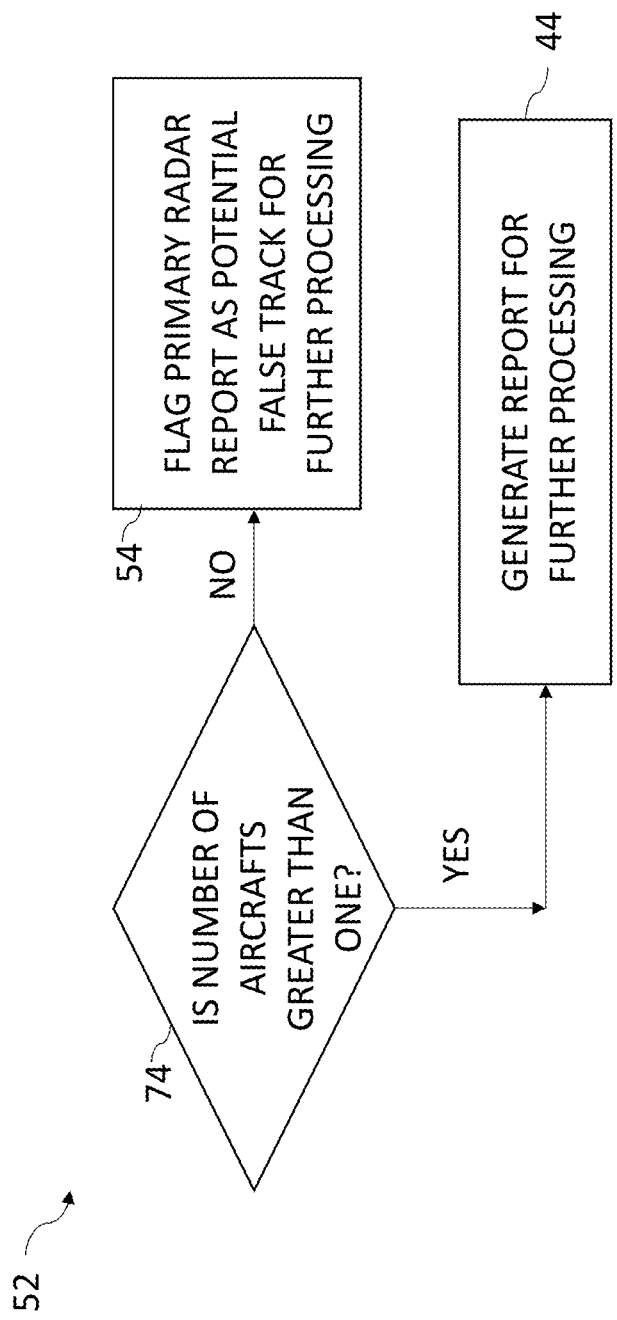
FIG. 7 shows another exemplary discriminator method.

For example, as shown in FIG. 7, a step 74 may include determining a number of aircraft corresponding to the stored flight plan data, as part of step 52 in determining whether the primary radar report 26 and real track meets a discriminator. For example, if the flight plan indicates that the number of aircraft in a formation of the aircraft 12 is greater than one, the primary radar report 26 may be determined to not be a false report and the primary radar report 26 may further be processed in step 44 of the method 38. If the number of aircraft in the formation of the aircraft 12 is one or is not indicated, the primary radar report 26 may be flagged as a potential false report and step 54 may occur in which further processing of the primary radar report 26 occurs.

Figure 8:
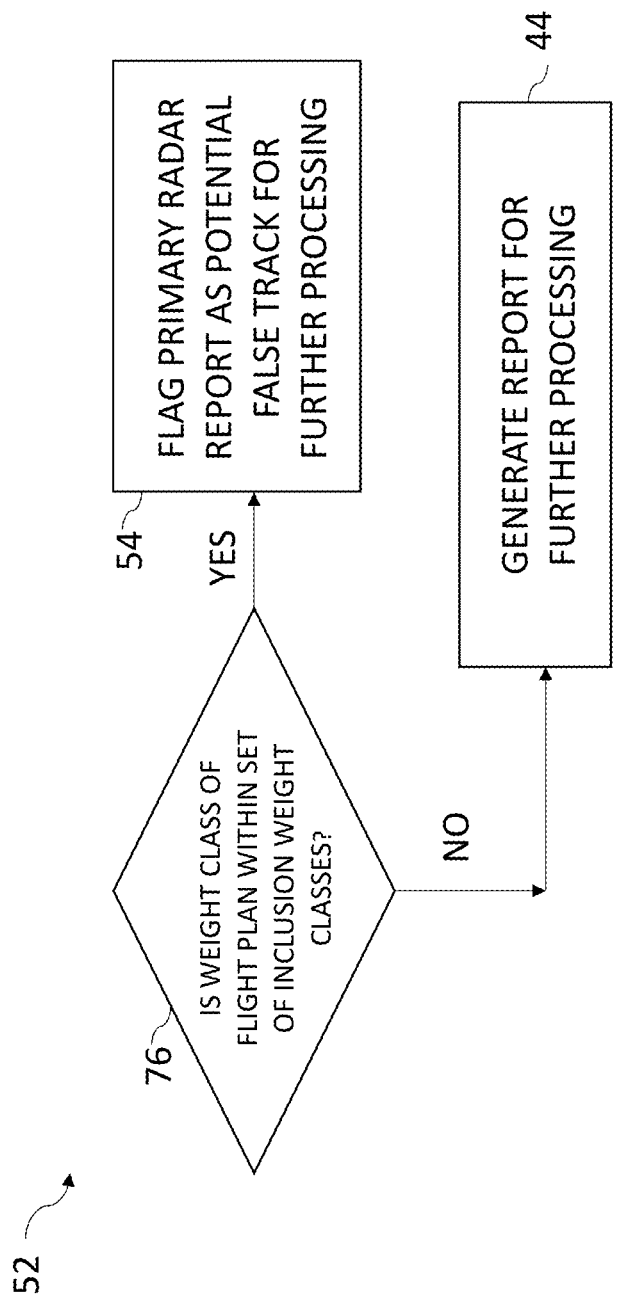
FIG. 8 shows still another exemplary discriminator method.

As shown in FIG. 8, still another discriminator may include using weight classes. For example, US aircraft classifications based on maximum certificated takeoff weights, e.g. super heavy, upper heavy, lower heavy, large, small plus, small light, and all other heavy, may be used. Step 76 may include determining whether the weight class defined by the flight plan of the real track for aircraft 12 is within a set of weight classes configured for inclusion. The flight plan of the real aircraft indicates a single weight class that the aircraft type is defined as. The application may limit further processing to heavier aircraft classes. If the flight plan of the aircraft 12 indicates a weight class that is not defined in the set of inclusion weight classes, step 44 occurs and the primary radar report 26 may be further processed. If the weight class of the flight plan is within the configured set of inclusion weight classes, step 54 occurs and the primary radar report 26 may be flagged as a potential false report.

Figure 9:
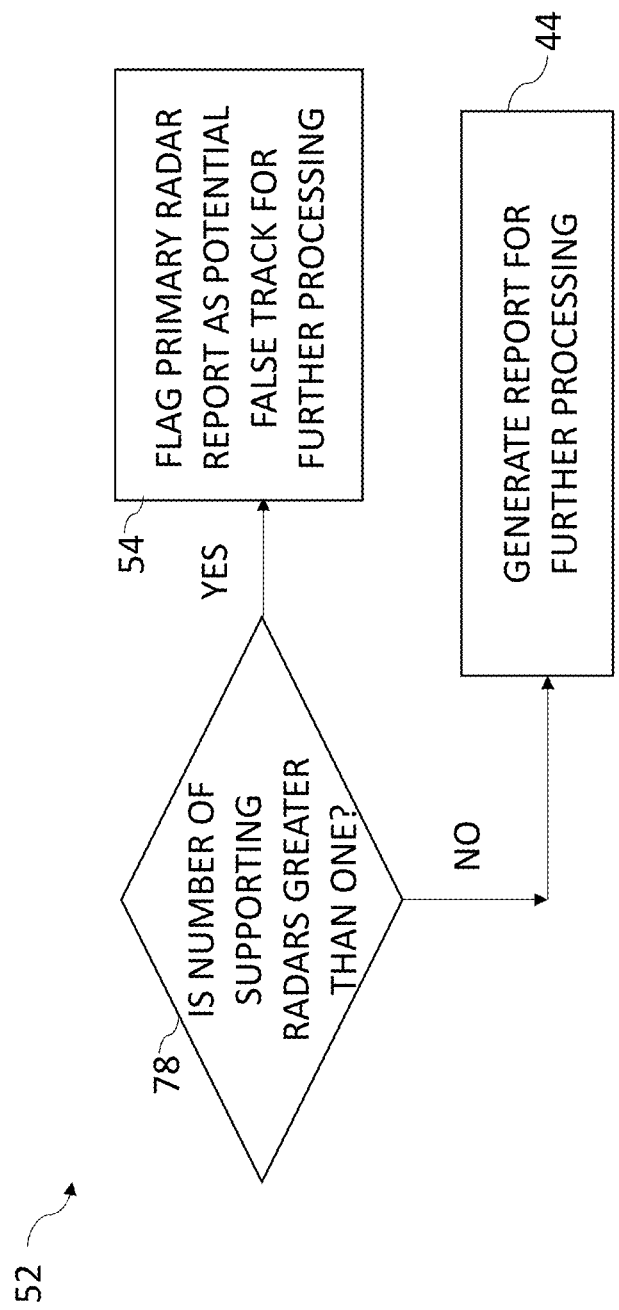
FIG. 9 shows still another exemplary discriminator method.

FIG. 9 shows another suitable discriminator as being a number of supporting radars for the real track. Step 78 may include determining a number of supporting radars for the real track. If real track is supported by more than one radar, step 54 may occur and the primary radar report 26 may be flagged as a potential false report. If the real track is supported by only one radar, step 44 may occur and further processing of the primary radar report 26 may occur. Any of the discriminators shown in FIGS. 6-9 may be used together or separately, or in combination with other discriminators.

Figure 10:
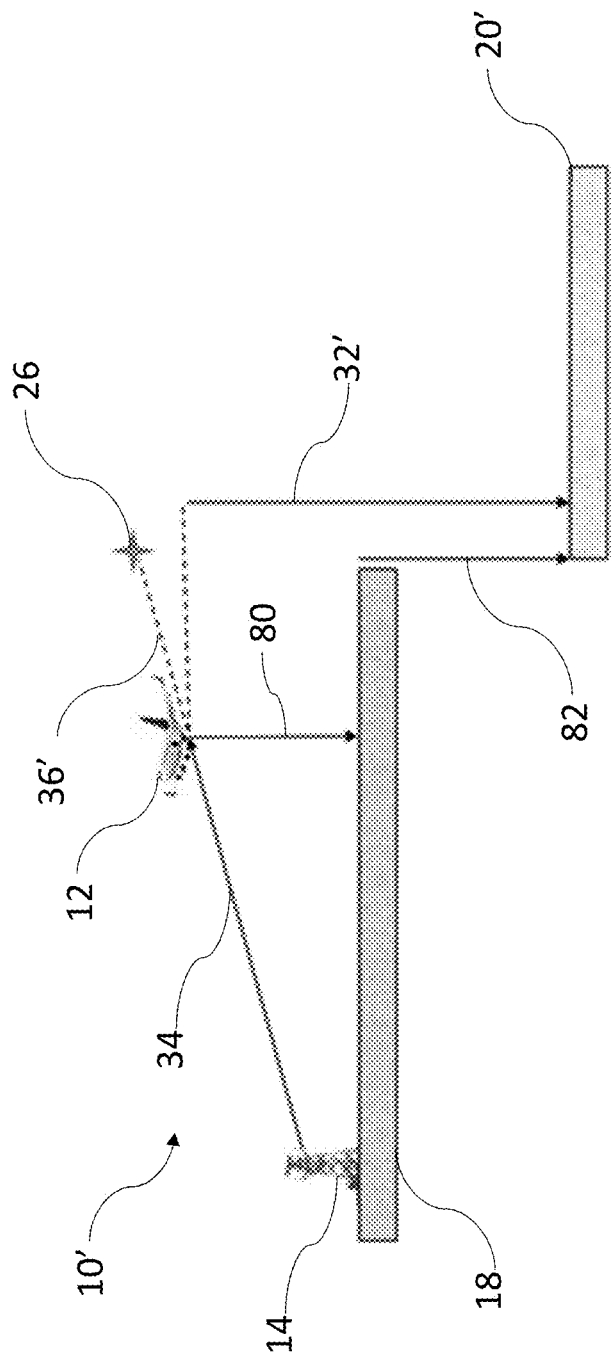
FIG. 10 shows a tracking system according to another exemplary embodiment in which the ground surface is above sea level.

Referring now to FIG. 10, another exemplary embodiment of the tracking system 10' is shown in which the ground surface 18 is higher than the altitude 32' of the aircraft 12, such that the ground surface 18 is not at sea level of the water 20'. Accordingly, the false track slant range 36' may be determined by adding the real aircraft slant range 34 and an aircraft height 80 above the ground surface 18. The aircraft height 80 above the ground surface 18 is equal to the aircraft altitude 32' less a ground surface level 82 above the sea level of the water 20'. The ground surface level 82 may be approximated using an antenna height of the radar 14, an airport elevation, or any other adapted elevation. The determined false track slant range 36' may be used for comparison with the detected primary radar report 26 as previously described, and the tracking system 10' may implement any of the previously described principles.

Figure 11:
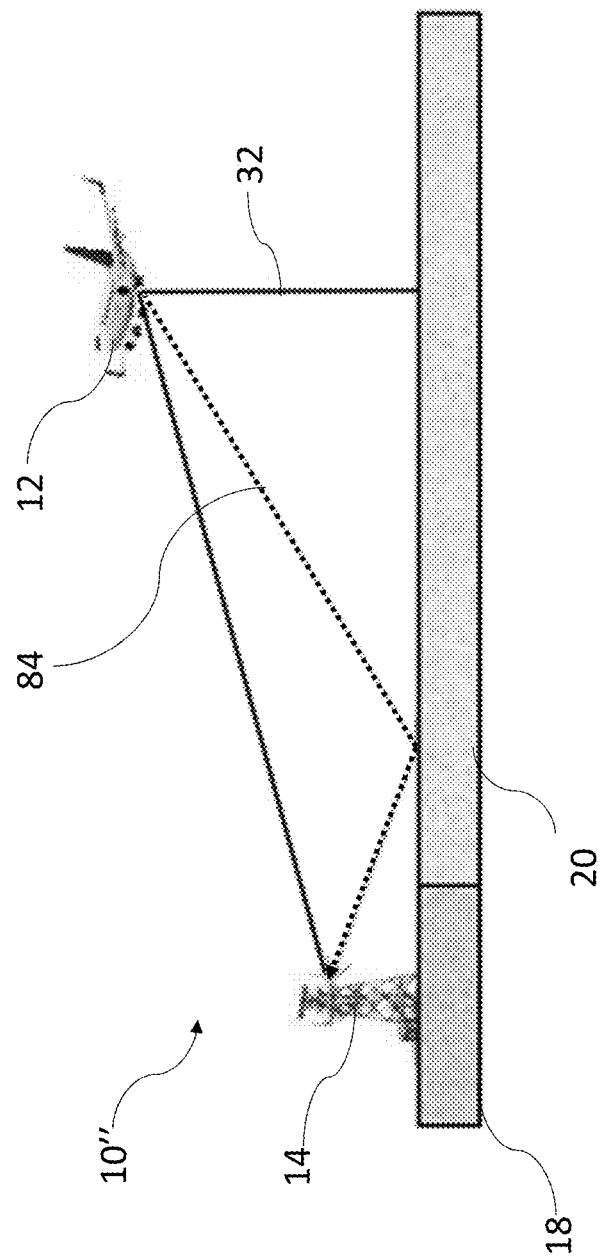
FIG. 11 shows a tracking system according to still another exemplary embodiment in which a second geometry of ground or water surface reflections is used to determine if the primary radar report is a false report.

Referring now to FIG. 11, still another exemplary embodiment of the tracking system 10" is shown in which a second reflection geometry is used to determine a false primary radar report that is proximate the aircraft 12, as compared with the first reflection geometry shown in FIG. 1A. The second reflection geometry may cover areas that are closer to the aircraft if the reflection geometry of FIG. 1A does not cover the areas that are closest to the aircraft. The second reflection geometry is based on the energy from the radar 14 illuminating the aircraft 12 resulting in a reflection return path 84 that occurs from the aircraft 12 to the ground surface 18 or water 20 to the radar 14. Using the second reflection geometry for a false track proximate the aircraft 12, the false track slant range may be approximated by the following equation:

$$\sqrt{RAGR^2 + (RAH + RH)^2}$$

where RAGR is the real aircraft ground range, RAH is the real aircraft height above the ground surface 18, and RH is the height of the radar 14 above the ground surface 18. RAH may be equal to the real aircraft altitude 32 less an estimated ground surface level and RH may be equal to the radar altitude less an estimated ground surface level. Similarly to using the first reflection geometry, a report must meet the geometric criteria for the detected primary radar report to be flagged as a potential false report. The geometric criteria for the second geometry in which the primary radar report is proximate the aircraft 12 may include the azimuth being within the azimuth threshold of the real aircraft, the slant range being greater than the slant range of the real aircraft, and the slant range being within a slant range error threshold of the determined false track slant range.

According to an aspect of the invention, a tracking system and method may include a basic tracking mechanism and a false track detection mechanism that may be performed by the ATC system. The basic tracking mechanism includes receiving a target report from a radar, such as the detection of an object, aircraft, clutter etc. The report has varying information such as range, azimuth as a minimum, Mode 3A code, and altitude. The report may be of a specific type, such as a primary, secondary, or reinforced report. The report undergoes association and correlation processing during which the report competes with many other received reports to see if the report relates to any existing tracks. The processing may include using the received position from the radar, such as the range and azimuth, as well as any other attributes the reports may have, such as altitude, Mode 3A code, or the type of report.

If the report is the best fit for an existing track, the report may continue on to an initiation and establishment processing of the existing track or a process for updating the track to continue to maintain the data for that track. If the report is not correlated to an existing track, the report may be eligible to initiate a new track barring that no other mechanisms disallows that from occurring. For example, filtering mechanisms or other eligibility processing mechanisms may prevent initiation. A track may be terminated if no updates are received for a configurable period of time.

The tracking system and method described herein is advantageous in that the system deals with reports that are reflections specifically reflected off of the aircraft itself and then off of the ground. Due to these reflections, in some cases, the radar gives the ATC system two reports for the aircraft nearly simultaneously. One first report will be for the real aircraft, with its path of detection being from the radar to the aircraft and back to the radar. The first report is typically detected by both the primary and secondary radar configured as a single radar system. The radar will report a reinforced report to the ATC system containing data such as slant range, azimuth, altitude, Mode 3A beacon code, and a Mode 2 code. The radar may also send a report that is a primary radar only, without secondary radar detection. This detection may result in energy from the radar that travelled from the radar to the aircraft, to the ground or water below the aircraft, back up to the aircraft and then back to the radar. Since this report is a primary only report, the report only has range and azimuth data for position information, such that the report does not contain altitude or codes. The slant range indicated in the report is longer than the slant range of the real report for the aircraft because the reflected energy travelled much farther. Accordingly, the tracking system and method is then used to determine whether this primary radar report is false or not.

Determining whether the primary radar report is false or not first includes the ATC system receiving a report from the radar. The report could be of various report types, such as a primary radar report, beacon radar report, or reinforced report. If report is a secondary or reinforced report, or a report from some other non-radar surveillance source, the report undergoes association and correlation processing as contained in the basic tracking mechanism. If the report is a primary radar report, the primary radar report is associated to nearby and already existing real tracks for the aircraft that are maintained by the ATC system. The information for the real tracks is used to define criteria for determining if the primary report is potentially false or not.

For each real track that is nearby and associated to the report, the system is configured to determine the capture area based on the real track's slant range from the radar, the "effective" altitude above the ground surface, and the azimuth from the radar. The effective altitude of the real track is determined or derived from the radar reported altitude by adjusting for barometric pressure and adjusting for the height of ground level above mean sea level. This effective altitude and the slant range of the real track (with respect to the sourcing radar) added together form what is referred to as the false track slant range and coupled with the azimuth of the real track to define the expected capture area of where false reports may be.

After the capture area is determined, the system is configured to determine if a position indicated in the primary report is in the capture area by comparing the primary report slant range and azimuth to the capture area. If the report is not in the capture area, the report is not considered a potential false report and can continue further processing into the ATC system tracking mechanisms to determine if the report correlates with existing tracks. The report may be processed using the basic tracking mechanism previously described for correlation at this point.

If a position indicated in the report is in the capture area, the report is potentially a false report and sent for further processing. Further processing includes checking discriminators that may include or exclude the report. Discriminators may be particularly used to limit the processing to real commercial aircraft while also trying to prevent processing of aircraft that may be military and may actually have a real wingman nearby. If the report meets the set of discriminators such that it still qualifies as a false report, the report is then marked as a potential false report.

The potential false report is then sent through the basic tracking mechanism association and correlation, but the outcome is changed due to the report being marked as potentially false. During correlation, if the report correlates to any existing established track, then it may continue to update that track even if the report was marked as potentially false. During correlation, if the report correlates to an existing track but that track is not yet established, it may be disallowed to continue initiation processing and establishment. During correlation, if the report does not correlate to any existing tracks, since the report is marked as a potential false report, it is not allowed to initiate a new track. Using existing mechanisms of the ATC system, the report may be just discarded or sent for display as a plot to the controller display.

Various techniques described herein may take the form of program code (i.e., instructions) embodied in tangible media, such as floppy diskettes, compact disc-read-only memory (CD-ROMs), digital versatile disc (DVD), hard drives, non-transitory computer readable storage medium, or any other machine-readable storage medium. When the program code is loaded into and executed by a machine, such as a computer, the machine becomes an apparatus for practicing the various techniques. Circuitry may include hardware, firmware, program code, executable code, computer instructions, and/or software. A non-transitory computer readable storage medium may be a computer readable storage medium that does not include signal. In the case of program code execution on programmable computers, the computing device may include a processor, a storage medium readable by the processor (including volatile and non-volatile memory and/or storage elements), at least one input device, and at least one output device.

The volatile and non-volatile memory and/or storage elements may be a random-access memory (RAM), erasable programmable read only memory (EPROM), flash drive, optical drive, magnetic hard drive, solid state drive, or other medium for storing electronic data. One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

The functional unit described in this specification has been labeled as a module which may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like. The module may also be implemented in software for execution by various types of processors. An identified module of executable code may, for instance, comprise one or more physical or logical blocks of computer instructions, which may, for instance, be organized as an object, procedure, or function. The executables of an identified module need not be physically located together, but may comprise disparate instructions stored in different locations which, when joined logically together, comprise the module and achieve the stated purpose for the module.

A module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A computer implemented method for tracking an aircraft using a radar, the computer implemented method comprising:
receiving a first report and a second report for the aircraft;
determining that the first report correlates to a real track of the aircraft;
determining that the second report correlates to a primary radar report;
determining a false track slant range associated with the aircraft based on an effective altitude of the aircraft above a ground or water surface and an aircraft slant range defined between the radar arranged on the ground and the aircraft;
determining a false track capture area based on the false track slant range and an azimuth of the aircraft from the radar; and
determining whether the primary radar report is a false report by determining whether a position in the primary radar report is in the false track capture area.

2. The computer implemented method of claim 1, wherein the azimuth of the aircraft is determined based on the established real track associated with the aircraft.

3. The computer implemented method of claim 1, wherein determining the false track slant range includes adding the aircraft slant range and the altitude together to equal the false track slant range.

4. The computer implemented method of claim 1 further comprising:
   excluding the false report from a new track initiation or establishment of a new track that is proximate the aircraft.

5. The computer implemented method of claim 1 further comprising:
   storing data corresponding to a set of discriminators;
   determining whether the primary radar report is the false report further based on the stored set of discriminators;
   determining whether the primary radar report correlates to at least one of a plurality of existing tracks if the primary radar report is determined to be the false report; and
   excluding the false report from a new track initiation or establishment of a new track that is proximate the aircraft if the primary radar report does not correlate to at least one of the plurality of existing tracks.

6. The computer implemented method of claim 5 further comprising:
   updating at least one of the plurality of existing tracks using the primary radar report if the primary radar report is determined to correlate to the corresponding one of the plurality of existing tracks, or
   initiating a new track for another aircraft using the primary radar report if the primary radar report is determined to not correlate to at least one of the plurality of existing tracks.

7. The computer implemented method of claim 1 further comprising:
   storing data corresponding to a predetermined delta azimuth threshold;
   determining an absolute value of a delta azimuth between a real track azimuth of the aircraft and an azimuth indicated in the primary radar report;
   comparing the absolute value to the stored data corresponding to the predetermined delta azimuth threshold; and
   identifying the primary radar report as the false report if the absolute value is less than or equal to the stored data corresponding to the predetermined delta azimuth threshold.

8. The computer implemented method of claim 1 further comprising:
   storing data corresponding to a predetermined false track slant range threshold;
   determining an absolute value of a delta slant range between the aircraft slant range and a primary radar report slant range of the primary radar report;
   comparing the absolute value to the stored data corresponding to the predetermined false track slant range threshold; and
   identifying the primary radar report as the false report if:
   the absolute value is less than or equal to the stored data corresponding to the predetermined false track slant range threshold, and
   the primary radar report slant range is greater than the aircraft slant range.

9. The computer implemented method of claim 1, wherein determining the false track slant range includes determining a surface level distance between the ground surface and the radar.

10. The computer implemented method of claim 1 further comprising:
    storing data corresponding to an altitude constraint for the real track;
    detecting an altitude of the real track; and
    identifying the primary radar report as a false report if the detected altitude of the real track is less than or equal to the altitude constraint.

11. The computer implemented method of claim 1 further comprising:
    storing data corresponding to a slant range constraint for the false track slant range; and
    identifying the primary radar report as a false report if a slant range indicated in the primary radar report is less than or equal to the slant range constraint.

12. The computer implemented method of claim 1 further comprising:
    storing data corresponding to a Mode 3A code for the real track of the aircraft; and
    determining that the primary radar report is not a false report if the real track has an invalid or non-discrete Mode 3A code.

13. The computer implemented method of claim 1 further comprising determining that the primary radar report is not a false report if the real track squawks a Mode 2 code.

14. The computer implemented method of claim 1 further comprising:
    storing flight plan data corresponding to the real track of the aircraft; and
    determining if the primary radar report is a false report based on whether the real track is associated or unassociated with the flight plan.

15. The computer implemented method of claim 14 further comprising determining that the primary radar report is not a false report if the flight plan includes data corresponding to a number of aircraft being more than one.

16. The computer implemented method of claim 14 further comprising determining that the primary radar report is not a false report if the flight plan indicates that the detected real track is assigned to a Military Operations Area.

17. The computer implemented method of claim 14 further comprising determining whether the primary radar report is a false report based on a weight class of the real track according to the flight plan.

18. The computer implemented method of claim 1, wherein determining the false track slant range includes using a reflection return path that occurs from the aircraft to the ground surface to the radar.

19. A computer-readable medium having processor-executable instructions implementable to execute the computer implemented method according to claim 1.

20. A tracking system for an aircraft, the tracking system comprising:
    a radar configured to detect a primary radar report; and
    a processor communicatively coupled to the radar for receiving the primary radar report,
    wherein the processor is configured to:
       establish a real track for the aircraft,
       determine a false track slant range associated with the aircraft based on an effective altitude of the aircraft above a ground surface and an aircraft slant range defined between the radar arranged on the ground surface and the aircraft, determine a false track capture area based on the false track slant range and an azimuth of the aircraft, and
determine whether the primary radar report is a false report by determining whether a position of the aircraft determined from the primary radar report is in the false track capture area.

* * * * *